Figure 1:
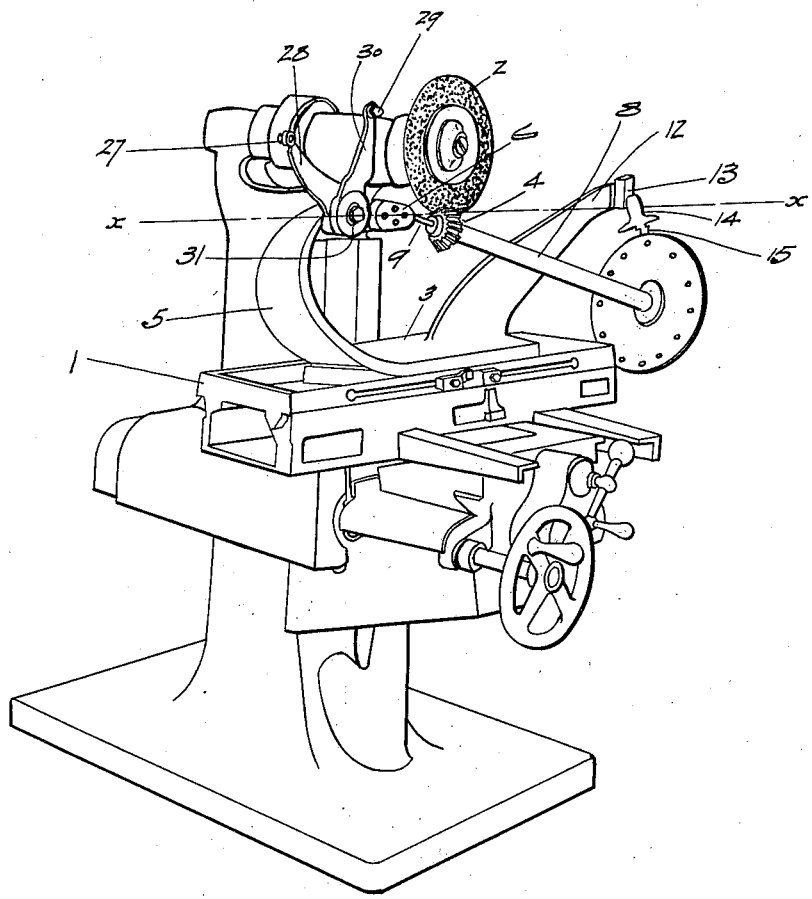

DE WITT C. COOKINGHAM & J. H. HERTNER.
GEAR TRUING MACHINE.
APPLICATION FILED NOV. 30, 1910.

1,058,353.

Patented Apr. 8, 1913.

4 SHEETS—SHEET 1.

DE WITT C. COOKINGHAM & J. H. HERTNER.
GEAR TRUING MACHINE.
APPLICATION FILED NOV. 30, 1910.

1,058,353.

Patented Apr. 8, 1913.
4 SHEETS—SHEET 2.

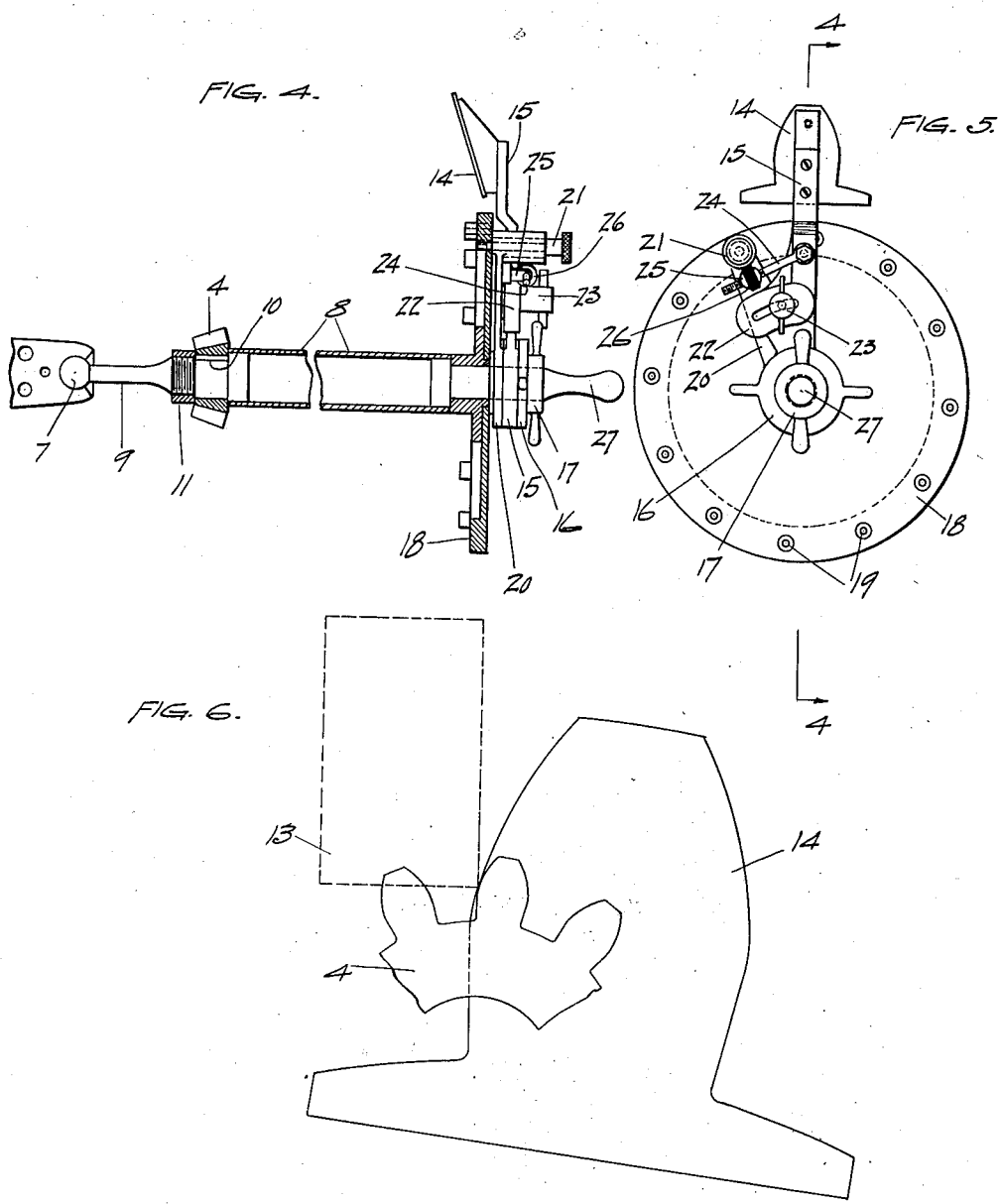

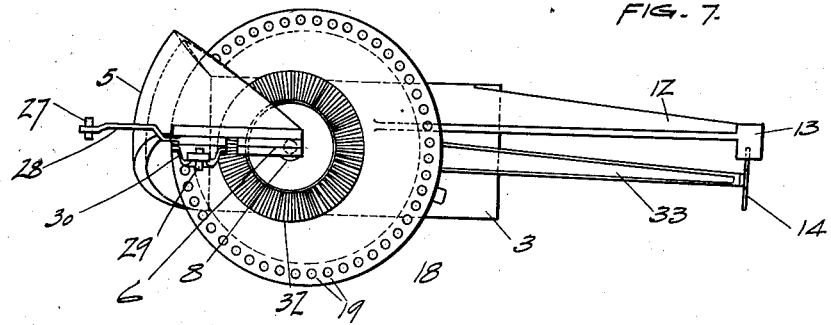
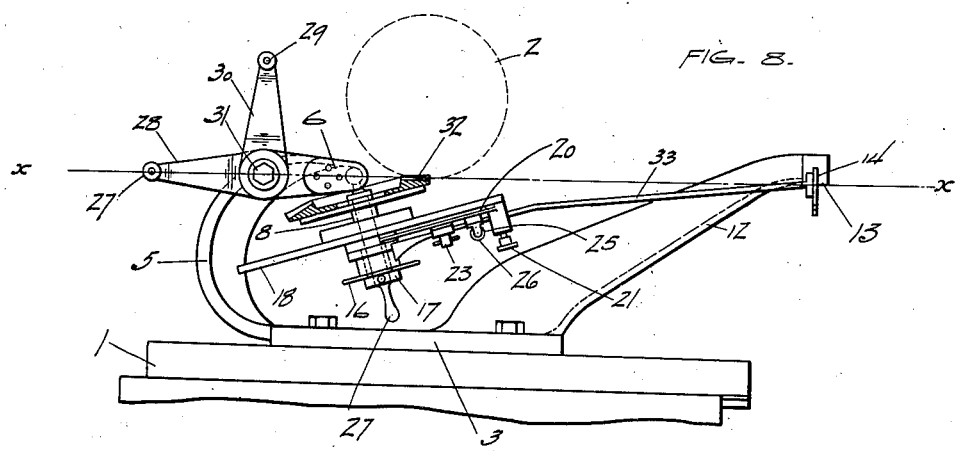
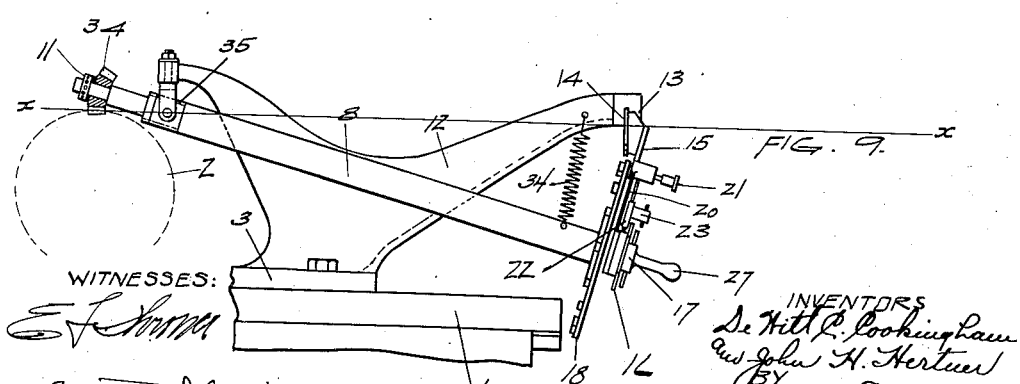

UNITED STATES PATENT OFFICE.

DE WITT C. COOKINGHAM AND JOHN H. HERTNER, OF CLEVELAND, OHIO, ASSIGNORS TO THE RAUCH AND LANG CARRIAGE COMPANY, OF CLEVELAND, OHIO, A CORPORATION OF OHIO.

GEAR-TRUING MACHINE.

1,058,353.  Specification of Letters Patent.  Patented Apr. 8, 1913.

Application filed November 30, 1910. Serial No. 594,982.

*To all whom it may concern:*

Be it known that we, DE WITT C. COOKINGHAM and JOHN H. HERTNER, citizens of the United States, and residents of Cleveland, county of Cuyahoga, State of Ohio, have jointly invented a new and useful Improvement in Gear-Truing Machines, of which the following is a specification, the principle of the invention being herein explained and the best mode in which we have contemplated applying that principle, so as to distinguish it from other inventions.

Among the refinements which have been introduced into various manufacturing processes and operations by the expansion and perfection of the automobile industry, may be included the trimming and truing of gears for use in connection with automobiles and more particularly with the driving mechanism of automobiles. Owing to the severe usage to which the gears just named are subjected, it has become necessary to temper or harden them, which of course, is only feasible after they have been cut. As a result, however, of such hardening, the gears are apt to be warped more or less, which is objectionable, since even where the warpage or distortion, is very slight, the operation of the gear will be rendered noisy if not actually inefficient. It has accordingly become the practice to grind the teeth of such gears after the hardening or tempering process, in order to render them exactly true and insure their perfect meshing, when assembled in the completed mechanism.

Our present invention, then, has as its object the provision of efficient means for thus truing gears by grinding their teeth to conform perfectly to the design upon which they have been laid out and cut.

More especially the present improvements are concerned with means for thus trimming or truing beveled gears, which, so far as we are aware, have never heretofore been successfully trimmed or ground on a commercial scale, owing to certain obvious difficulties compared with the truing of ordinary spur gears. In this latter operation, a formed grinding disk can be used, so that, by merely preserving the contour of such disk, perfectly ground teeth on the gear can be assured. This, however, is not possible in the case of beveled gear teeth, while to use the edge of the grinding disk or wheel, as alone is possible in machines previously designed for the purpose in hand, is impracticable owing to the importance of preserving such edge. With a view, then, to the accomplishment of the above named and related objects, the present invention consists of the means hereinafter fully described and particularly pointed out in the claims.

The annexed drawings and the following description set forth in detail certain mechanism embodying the invention, such disclosed means constituting, however, but several of the various mechanical forms in which the principle of the invention may be used.

Figure 2:
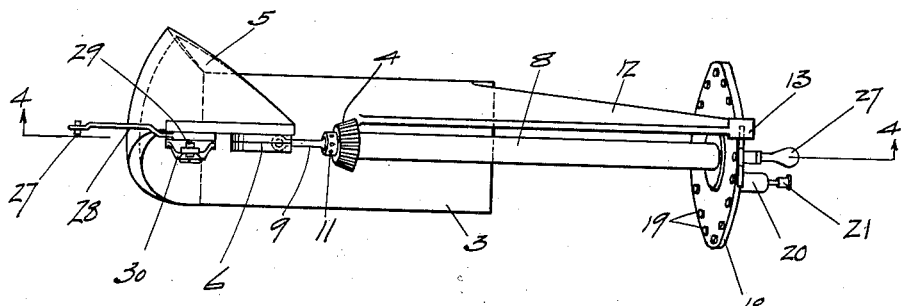
Figure 3:
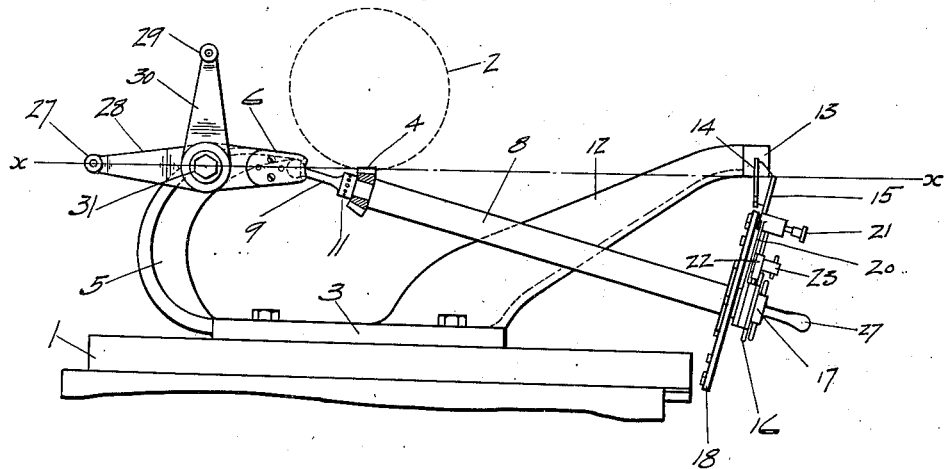

In said annexed drawings:—Figure 1 is a perspective view of a gear truing machine embodying our present improvements; Fig. 2 is a plan view of the essential parts of such machine; Fig. 3 is a side elevational view of the same; Fig. 4 is a sectional view of the shaft used to support the gear during the truing and trimming operation together with certain associated parts, the plane of the section being indicated by the line 4—4, Fig. 2; Fig. 5 is an end elevation of such shaft and parts; Fig. 6 is a diagrammatic view illustrating the method exemplified in the operation of the machine; Fig. 7 is a plan view corresponding to Fig. 2, but illustrating certain modifications in the construction of the machine; Fig. 8 is a side elevational view of such modified construction, it being noted that both in Figs. 3 and 8 the gear being operated upon is shown in section; and Fig. 9 is a side elevation of yet another modification.

The general features of the machine need be but briefly noted, inasmuch as they do not differ from familiar types of grinding machines. Thus a table 1 is provided, shiftable in right-angularly related horizontal directions beneath a grinding disk 2 rotatably supported in a vertical plane alined with one such direction. The driving connections for the spindle that carries the grinding disk, as well as the feed mechanism for shifting the table in the two directions just referred to, need not be described in detail, as they are all well-known constructions. Upon the table is supported the base 3 of the mechanism of present interest, it being upon this base that the gear 4 to be ground is supported.

Referring more particularly to Figs. 2 and 3, it will be seen that a standard 5 is provided at one end of such base, preferably of the recurved form illustrated, so as to extend inwardly over the base while still leaving a clear space for the movement of certain parts, as will be hereinafter more fully described. This standard is provided with a socket-bearing 6 composed of plates secured thereto and to each other, such plates having their contiguous faces formed with spherical concavities (shown in Fig. 4) adapted to receive the spherical, or ball-like, terminal 7 of the work-supporting spindle or shaft 8. The construction of the latter is preferably made as light as possible consistant with a proper degree of rigidity, inasmuch as its weight, in the simpler form of machine at least, will be sustained by the operator, when the machine is in use. Accordingly said spindle is made of a section of pipe, or other tubular material, save for a short section at its inner end where a solid shaft 9 is provided to receive the gear to be operated upon. Such section 9 is provided with a key-way 10, so that the gear is non-rotatably held thereon, while at the same time it is clamped between the end of the tubular portion of the shaft and a threaded collar 11, so as to be held securely against longitudinal movement on the shaft. Accordingly, in order to take off a finished gear and put on a new one, outermost bearing plate 6 is removed, thus entirely releasing the spindle 8. It is then merely necessary to un-screw collar 11, whereupon the gear 4 may be slipped off spindle-end 9 and replaced with another.

A straight line ($x$—$x$, Figs. 1 and 3) passing through the axis of the ball and socket joint, by means of which the shaft 8 is thus seen to be attached to standard 5, and through the edge of the disk 2 used in the trimming or grinding operation, is designed to be parallel with that direction of the movement of the base 3, with which the plane of the grinding disk is alined. At the opposite end of the base, from that bearing the standard 5, there extends a finder arm 12 provided at its outer extremity with a lateral projection 13 of angular outline, one edge of such projection lying in a prolongation of the line $x$—$x$, previously referred to as passing through the center of the shaft's pivotal attachment to the standard 5, and the cutting edge of the disk 2, and the face of such projection lying in the same plane as one of the lateral faces of the grinding disk.

By supporting at the outer end of the shaft at a proper radial distance from said shaft's axis, a templet of the same cross-sectional form as a tooth of the gear to be trued and of a size to correspond with the distance of such template from the point of pivotal attachment of said shaft as compared with the distance of the gear 4 being ground from such point, it will be seen that upon manipulating the shaft so as to bring any point on the plane surface of such enlarged tooth into contact with the edge of the finder just referred to, a corresponding point on the alined tooth of the gear will be presented to the lateral face of the grinder. Hence, if such gear tooth be not perfect, the grinding will obviously penetrate its surface until such surface is rendered perfectly true. By bringing successive points on the guiding tooth into contact with the finder, the grinding disk will be caused to true corresponding points on the gear, so that by a proper reciprocation of the base 3 effected through the feeding movement of the table upon which it is mounted, the entire surface of the particular tooth corresponding in position with the guide tooth may be trimmed off, or ground, to the proper contour. In other words, the relation of the several parts of the machine will be rendered clear by considering the operative lateral face of the disk and the face of the finder as lying in the same plane, which plane is intersected by the line which defines the axis of the shaft. The gear tooth and templet then being carried on said shaft so as to bear a similar relation to such axial line, the cross-sectional form of said gear tooth and templet being the same, and their relative size proportionate to their distance from the point of intersection of the line with the plane, it will be seen that corresponding points on both will simultaneously be brought into tangency with such plane by proper manipulation of the shaft. The contact is in effect a surface contact, it being against the sides of the grinding disk and the finder that the gear tooth and templet are respectively pressed. The relation of the gear to the guide tooth and of the latter to the finder, the face of which it will be remembered is in line with the operative face of the grinding disk, is shown in end-wise elevation in Fig. 6; from this figure, taken in conjunction with Figs. 1 and 3, the manner in which the several parts coöperate in the operation just described should be readily grasped.

The guide tooth or templet 14, as it may properly be termed, is supported at the outer end of an arm 15 rotatably mounted upon the free end of the shaft 8, being clamped against certain other parts by means of a nut 16 that is in turn secured against rotation, once the parts are positioned, by a second or lock nut 17. Said templet tooth is not only thus supported at a proper radial distance from the axis of the shaft to correspond with its distance from the point of pivotal attachment of the shaft to the supporting standard 5, but also at an angle corresponding with the bevel of the gear which is being trimmed.

The parts against which the supporting arm 15 for the tooth is clamped upon the end of the shaft comprise first of all a disk 18 that is non-rotatably secured to the shaft and provided near its edge with a circular series of engaging elements in the form of apertures 19 equidistantly spaced about the circumference of the disk and corresponding in number to the number of teeth on the particular gear 4 which it is desired to trim, or true. Between such disk and the tooth-supporting arm 15, is a second arm 20 similarly rotatably mounted upon the shaft and adapted to be clamped thereagainst, along with the disk and said tooth-supporting arm. In the outer end of this second arm is a resiliently mounted plunger 21, the inner end of which is adapted to engage with any selected one of the apertures 19 in the disk 18. The two arms 15 and 20 are adjustably connected together by means of a segmental, slotted guide 22 carried by such first arm (see Fig. 5) and extending over the second arm and clamped thereto by means of a clamp-nut 23 threaded upon a stud carried by such second arm. In order to adjust quite accurately, the angular distance between the two arms, a bolt 24 pivotally secured to the first arm is loosely passed through a bifurcated lug 25 in the second arm and has threaded upon it a knurled nut 26, which is held between the portions in such lug and so adapted, upon being rotated, to move the bolt in one direction or the other.

The solid outer end of the shaft which receives the several parts just described is preferably rounded off to form a handle 27, as shown in the several figures, so that the operator, grasping the same, may readily swing the shaft about the point of its pivotal attachment to the standard 5, in order to bring all points along the outline of the guide tooth or templet 14 into contact with the edge of the projection 13 on the finder 12.

The general operation of the form of machine just described may now be readily followed:—The beveled gear 4 to be trimmed or trued is first securely clamped in place upon the inner end of the shaft and the latter then secured in the socket-bearing 6 provided therefor. The key-way in such gear wherewith key 10 engages, it will be understood, is the same key-way which is subsequently utilized in securing such gear in the mechanism, of which it is ultimately to form a part. As it will be a matter of some difficulty, or at least trouble, to make the angular position of this key-way with respect to the adjacent teeth always the same in a series of gears, we have provided the adjustable indexing means for locating the templet or guide tooth 14 at the outer end of the shaft. Accordingly, the next step in the operation is to secure the arm 20 with the plunger 21 carried thereby in any one of the apertures 19 in the index plate 18, such apertures corresponding approximately with the location of the teeth on the gear. The arm 15 which carries the templet is then adjusted by means of nut 25, so that when it contacts with the finder, the grinding disk will remove just the proper amount of material from the tooth without having to cut in too deeply. The amount of material that may be removed is of course gaged in the original cutting of the gear, previously to its being hardened or tempered. When this adjustment has been accurately determined the two arms 15 and 20 are securely clamped together by means of the nuts 16 and 17, and for the remaining teeth it is merely necessary to shift the plunger in the end of arm 20 from one aperture 19 in the index plate to the next. By proper manipulation of the handled shaft each tooth is then ground to the true form defined by the guide tooth or templet, the table which carries the support being of course reciprocated the while.

In order to preserve the cutting edge of the disk 2 perfectly true, a truing device is provided preferably consisting of a diamond 27 carried on the outer end of an arm 28 that is oscillatorily mounted upon the same standard 5, to which the inner end of the shaft 8 is attached. By reason of the manner in which it is mounted, such arm may be swung forwardly in order to bring the diamond into engagement with the operating lateral face of the disk, as need scarcely be explained. The accuracy with which the disk is thus trimmed, as well as its correct initial position, may be determined by means of a gage consisting of a screw 29 adjustably mounted in the outer end of a second arm 30, similarly oscillatorily mounted upon the standard 5 and about the same axis as the first arm carrying the trimming diamond. Upon swinging this arm forward, the gage carried thereby is brought opposite the face of the grinding disk and any change in the relative position of the latter may thus be readily determined. When the machine is in operation both these arms are of course swung back, out of the way. Whenever the gage-carrying arm 30, or, more particularly, the diamond-carrying arm 28 is turned forwardly into operative position, it may be securely there clamped by means of a lock nut 31 upon the bolt which forms the pivotal axis of such arms. (See Figs. 1 and 3.)

It will be observed that in the figures thus far referred to, as showing our improved gear truing machine, the gear therein appearing is of relatively small diameter and to the grinding of such a small gear or pinion the arrangement of apparatus in question is admirably adapted. Where, however, a beveled gear of larger diameter requires to be trimmed, one in which, in other words, the inclination of the teeth to the axis of the gear more nearly approaches a right angle, it will be evident that to have the shaft of any length whatever, would necessitate providing for a range of movement of its outer end entirely out of the question if the machine is to be made of practicable dimensions. Accordingly where gears of larger radius, having teeth corresponding more sharply inclined to the gear aixs, are to be trued, we modify the arrangement of the shaft, as shown in Figs. 7 and 8. This modification, as will be obvious from an inspection of the figures just referred to, consists simply in the shortening of the shaft 8, both by lessening the distance between the point of its pivotal attachment to the standard 5 and the point at which the layer gear 32 is clamped thereon; as also by lessening the distance between such gear and the index plate 18 which carries the templet or guide teeth 14. The latter is mounted on an arm 33, that although adjustably secured to the index plate in the same manner as before, is considerably longer, such arm furthermore in this case being made of ribbed construction, as appears in Fig. 7, in order that it may serve to support such guide tooth with sufficient rigidity. Said tooth, owing to the change in the disposition of the axis of the shaft that carries the gear being trimmed, is attached at substantially right angles to the outer end of the arm 33, so as to preserve a proper alinement with the successive teeth on the gear as such arm is gradually moved around the index plate. The shaft in this construction, it will be seen, depends downwardly instead of extending horizontaly from the socket-bearing 6, in which its inner ball-shaped end is held; the plates forming such bearing require, accordingly to be differently fashioned from those used in connection with the preceding form of apparatus and it is for this reason that these plates are made detachable, namely in order that they can be readily changed to adapt the machine for the handling of different sizes of gears. The mode of operation of this modified form of the machine is obviously the same as that of the preceding form, and so does not require special attention.

While in both forms of the machine hereinbefore described, it is contemplated that the operator will be able to swing the shaft 8 that carries the gear and the index plate, without the burden becoming wearisome, the weight of such parts may be partly or entirely sustained, and corresponding relief afforded the operator. For this purpose the simplest arrangement is that illustrated in Fig. 9, where the form of machine first described, is shown with a tension spring 34 connected between the outer end of the shaft 8, at a point just short of the index plate, and a convenient point on the finder arm. The effect of this spring is to tend to draw the shaft toward the arm and thus to hold the templet against the edge of the finder, so that all that is required of the operator is to control the movement of such templet along the finder's edge. It will be understood that the point of attachment of the spring at either end may be varied from that shown, as also that in place of a spring, a counterweight or like means can be utilized to partially or entirely carry the weight of the shaft and the parts attached thereto. In such two typical forms of our invention, moreover, the relative disposition of the parts carried by spindle 8 has been the same; in other words, the work, or gear to be ground, is located on said spindle intermediate between the pivot point of the latter in its bearing and the templet-carrying disk 18. As a matter of fact, this disposition may be varied without departing from the spirit of invention; for example, the spindle, by being prolonged through the aforesaid pivot point, may be adapted to carry the work on its inner end without any change in the relative size of the templet. This is also illustrated in Fig. 9, where the spindle 8 is shown as supported by a universal joint 35, beyond which it projects to receive the gear 34. The latter is reversed in its position, and the disk located below the line $x$—$x$, but otherwise no change is involved.

The templet may also, if desired be carried on the spindle between the latter's point of pivotal support and the work, but as this would involve the use of a templet smaller, instead of larger, than the tooth being trimmed, such arrangement would not have much practical value in the field of use specified.

Other modes of applying the principle of our invention may be employed instead of the one explained, change being made as regards the mechanism herein disclosed, provided the means stated by any of the following claims or the equivalent of such stated means be employed.

We therefore particularly point out and distinctly claim as our invention:—

1. In mechanism for truing bevel gears, the combination of a work-holding member having a universal pivotal support; a templet carried by said member and of the same cross-sectional form as a tooth of the gear to be trued; a finder adapted to have a surface contact with said templet; and grinding means adapted to operate upon such work.

2. In mechanism for truing bevel gears, the combination of a relatively reciprocable base and a grinding wheel, the latter being mounted adjacent to the former; a spindle universally pivotally supported upon said base; a templet carried by said spindle at a distance from such support greater than that of the work, said templet being of the same cross-sectional form as a tooth of the gear to be trued; and a finder mounted upon said base and adapted to have a surface contact with said templet.

3. In mechanism for truing bevel gears; the combination of a work-holding member having a universal pivotal support at one end; a templet carried by said member, said templet being of the same cross-sectional form as a tooth of the gear to be trued, and the work being secured to said member at a point intermediate between its pivotally supported end and said templet; a finder adapted to have a surface contact with said templet; and grinding means adapted to operate upon such work.

4. In mechanism for truing bevel gears, the combination of a relatively reciprocable base and a grinding wheel, the latter being mounted adjacent to the former; a spindle having a universal pivotal support at one end upon said base; a templet carried by said spindle, said templet being of the same cross-sectional form as a tooth of the gear to be trued, the work being secured to said spindle at a point intermediate between the latter's point of support upon said base, and said templet; and a finder mounted upon said base and adapted to have a surface contact with said templet.

5. In a machine for truing bevel gears, the combination of a suitable base; a grinding wheel mounted adjacent to said base and lying in a plane alined with its direction of movement; a spindle detachably secured at one end to said base by a universal pivotal joint; a templet carried by said spindle and having the same cross-sectional form as a tooth of the gear to be trued; means for removably securing the gear to be trued upon said spindle at a point intermediate between such pivotal joint and said templet; and a finder mounted upon said base and adapted to have a surface contact with said templet.

6. In a machine for truing bevel gears, the combination of a suitable base; a grinding wheel mounted adjacent to said base; a spindle detachably secured at one end to said base by a universal pivotal joint; means for removably securing the gear to be trued upon said spindle at a point intermediate between the latter's ends; a templet having the same cross sectional form as a tooth of such gear, carried upon said spindle beyond such gear; means for securing said templet in positions alined with successive teeth on the gear; and a finder mounted upon said base and adapted to have a surface contact with said templet.

7. In a machine for truing bevel gears, the combination of a suitable base; a grinding wheel mounted adjacent to said base; a spindle detachably secured at one end to said base by a universal pivotal joint; means for removably securing the gear to be trued upon said spindle at a point intermediate between the latter's ends; a templet, having the same cross-sectional form as a tooth of such gear, rotatably mounted upon said spindle at a point beyond said gear; means for securing said templet in position alined with successive teeth on the gear; and a finder mounted upon said base and adapted to have a surface contact with said templet.

8. In a machine for truing bevel gears, the combination of a suitable base; a grinding wheel mounted adjacent to said base; a spindle detachably secured at one end to said base by a universal pivotal joint; means for removably securing the gear to be trued upon said spindle at a point intermediate between the latter's ends; a disk non-rotatably mounted upon said spindle beyond such gear and bearing a circular series of engaging elements corresponding in number and position with the gear teeth; an arm rotatable about said spindle and adapted to engage with successive elements on said disk; a templet, having the same cross-sectional form as a tooth of such gear, attached to said arm; and a finder mounted upon said base and adapted to have a surface contact with said templet.

9. In a machine for truing bevel gears, the combination of a suitable base; a grinding wheel mounted adjacent to said base; a spindle detachably secured at one end to said base by a universal pivotal joint; means for removably securing the gear to be trued upon said spindle at a point intermediate between the latter's ends; a disk non-rotatably mounted upon said spindle beyond such gear and bearing a circular series of engaging elements corresponding in number and position with the gear teeth; an arm rotatable about said spindle and adapted to engage with successive elements on said disk; a templet having the same cross-sectional form as a tooth of such gear, adjustably attached to said arm; and a finder mounted upon said base and adapted to have a surface contact with said templet.

10. In a machine for truing bevel gears, the combination of a suitable base; a grinding wheel mounted adjacent to said base; a spindle detachably secured at one end to said base by a universal pivotal joint; means for removably securing the gear to be trued upon said spindle at a point intermediate between the latter's ends; a disk non-rotatably mounted upon said spindle beyond such gear and bearing a circular series of engaging elements corresponding in number and position with the gear teeth; an arm rotatable about said spindle and adapted to engage with successive elements on said disk; another arm similarly rotatable about said spindle; adjustable means connecting said two arms, whereby the latter may be secured in desired angular relation to the former; a templet, having the same cross-sectional form as a tooth of such gear, attached to said last-named arm; and a finder mounted upon said base and adapted to have a surface contact with said templet.

11. In a machine for truing bevel gears, the combination of a reciprocable base provided with a standard at one end; a grinding wheel mounted adjacent to said base and alined with its direction of movement; a spindle detachably secured at one end to said standard by a universal pivotal joint, the other end of said spindle being provided with a handle; a threaded collar for removably clamping the gear to be trued upon said spindle near its pivoted end; a templet carried upon said spindle near its handled end; said templet being of the same cross-sectional form as tooth of the gear to be trued, and a finder mounted at the other end of said base from said standard and adapted to have a surface contact with said templet.

12. In a machine for truing bevel gears, the combination of a reciprocable base provided with a standard at one end; a grinding wheel mounted adjacent to said base and alined with its direction of movement; a spindle detachably secured at one end to said standard by a universal pivotal joint, the other end of said spindle being provided with a handle; a threaded collar for removably clamping the gear to be trued upon said spindle near its pivoted end; a templet, having the same cross-sectional form as a tooth of said gear, carried upon said spindle near its handled end; means for securing said templet in positions alined with successive teeth on the gear; and a finder mounted at the other end of said base from said standard and adapted to have a surface contact with said templet.

13. In a machine for truing bevel gears, the combination of a reciprocable base provided with a standard at one end; a grinding wheel mounted adjacent to said base and alined with its direction of movement; a spindle detachably secured at one end to said standard by a universal pivotal joint, the other end of said spindle being provided with a handle; a threaded collar for removably clamping the gear to be trued upon said spindle near its pivoted end; a disk non-rotatably mounted upon said spindle near its handled end and bearing a circular series of engaging elements corresponding in number and position with the gear teeth; an arm rotatable about said spindle and adapted to engage with successive elements on said disk; a templet, having the same cross-sectional form as a tooth of such gear, attached to said arm; and a finder mounted at the other end of said base from said standard and adapted to have a surface contact with said templet.

14. In a machine for truing bevel gears, the combination of a reciprocable base provided with a standard at one end; a grinding wheel mounted adjacent to said base and alined with its direction of movement; a spindle detachably secured at one end to said standard by a universal pivotal joint, the other end of said spindle being provided with a handle; a threaded collar for removably clamping the gear to be trued upon said spindle near its pivoted end; a disk non-rotatably mounted upon said spindle near its handled end and bearing a circular series of engaging elements corresponding in number and position with the gear teeth; an arm rotatable about said spindle and adapted to engage with successive elements on said disk; a templet, having the same cross-sectional form as a tooth of such gear, adjustably attached to said arm; and a finder mounted at the other end of said base from said standard and adapted to have a surface contact with said templet.

15. In a machine for truing bevel gears, the combination of a reciprocable base provided with a standard at one end; a grinding wheel mounted adjacent to said base and alined with its direction of movement; a spindle detachably secured at one end to said standard by a universal pivotal joint, the other end of said spindle being provided with a handle; a threaded collar for removably clamping the gear to be trued upon said spindle near its pivoted end; a disk non-rotatably mounted upon said spindle near its handled end and bearing a circular series of apertures corresponding in number and position with the gear teeth; an arm rotatable about said spindle and provided with a plunger adapted to engage successive apertures in said disk; another arm similarly rotatable about said spindle; means adapted to clamp said arms and disk together; adjustable means connecting said two arms, whereby the last-named arm may be secured in desired angular relation to the first; a templet, corresponding in form with a tooth of such gear, attached to said last-named arm; and a finder mounted at the other end of said base from said standard and adapted to coöperate with said templet.

Signed by us this 26th day of November, 1910.

DE WITT C. COOKINGHAM.
JOHN H. HERTNER.

Attested by—
ANNA L. GILL,
JNO. T. OBERLIN.